United States Patent [19]

Nozawa et al.

[11] Patent Number: 4,704,022
[45] Date of Patent: Nov. 3, 1987

[54] VIDEO FINDER FOR SINGLE-LENS REFLEX CAMERA

[75] Inventors: Hideyo Nozawa, Ohmiya; Toshiro Hara, Yokohama; Masahiro Juen, Tokyo, all of Japan

[73] Assignee: Nippon Kogaku K. K., Tokyo, Japan

[21] Appl. No.: 904,491

[22] Filed: Sep. 8, 1986

[30] Foreign Application Priority Data

Sep. 12, 1985 [JP] Japan ............................ 60-202434
Dec. 2, 1985 [JP] Japan ............................ 60-270995
Dec. 16, 1985 [JP] Japan ............................ 60-282472
Dec. 16, 1985 [JP] Japan ............................ 60-282473
Dec. 24, 1985 [JP] Japan ............................ 60-291684

[51] Int. Cl.⁴ .......................................... G03B 13/02
[52] U.S. Cl. .................................................. 354/219
[58] Field of Search ................................... 354/76, 219

[56] References Cited

U.S. PATENT DOCUMENTS

4,051,496 9/1977 Iida et al. ............................ 354/219
4,557,572 12/1985 Schickedany ........................ 354/219

Primary Examiner—Michael L. Gellner
Attorney, Agent, or Firm—Shapiro and Shapiro

[57] ABSTRACT

A video finder in a single-lens reflex camera comprises a finder eyepiece, a penta roof prism disposed between the eyepiece and a focusing screen, a beam splitter disposed between the penta roof prism and the finder eyepiece, an image-forming optical system for forming a light image from the split beam and an image pickup device for forming a video signal corresponding to the light image formed by the image-forming optical system.

15 Claims, 8 Drawing Figures

VIDEO FINDER FOR SINGLE-LENS REFLEX CAMERA

BACKGROUND OF THE INVENTION

1. Field of the Invention

The present invention relates to a finder for a single-lens reflex camera, and more particularly the present invention is directed to such camera finder having a mount-in video pickup unit.

2. Related Background Art

In the art, there have been known and used remote control cameras for taking still pictures. For example, U.S. Pat. No. 4,051,496 has disclosed a remote control camera provided with a remote control receiver unit responsive to an operation signal from a transmitter. When the user takes a still picture, he carries out at first the framing of a picture through the camera finder within a determined range, and then stands apart from the camera to monitor the conditions for picture-taking. The receiver unit in the camera responds to an operation signal from the transmitter to take the aimed picture in the manner of remote control.

However, the above-mentioned type of the known remote control camera has the following drawbacks:

Since the photographer can not continuously observe the image in the finder, he often fails to catch good shutter chances.

It is difficult to attain such good framing in which the object is at the most desirable position in the determined picture area.

It is unallowable for the photographer to be so far away from the camera site. This requires a great deal of patience.

In taking a picture with the above-mentioned type of the remote control camera, therefore, it has been very difficult to surely catch the shutter chances which are, of course, not many.

To solve the above problem, a monitor system for remote control camera has already been proposed. In this system, a conventional video camera is additionally mounted on a single-lens reflex camera, behind the eyepiece of the camera finder. At a position remote from the picture-taking site (camera site) there is set a television receiver which receives a monitoring image from the video camera on the single-lens reflex camera. The photographer can perform a remote control picture-taking while observing the monitoring image on the monitor television.

This remote control camera provided with a monitoring system also has many drawbacks.

First of all, the remote control camera is heavy and large due to the video camera additionally mounted on the rear part of the camera. This renders the camera not easy to handle.

The photographer can not check the picture frame area directly through the camera finder when he wishes it, for example, at the time of setting the camera. The video camera on the rear part hinders the direct observation through the viewfinder.

Furthermore, since the single-lens reflex camera and the video camera are two separate apparatus, an additional heavy work is needed for connecting the signal lines to transmit and receive information of picture-taking between the two apparatus.

SUMMARY OF THE INVENTION

Accordingly, the object of the present invention is to provide a single-lens reflex camera with which the user can observe the view field of the finder through a monitoring television and which is compact in construction and easy to handle.

The above object is attained by the present invention. In the single-lens reflex camera according to the invention, an image pickup device for video camera, for example, a solid state image pickup device such as CCD is mounted in the housing of the finder of the reflex camera. A light beam passing through the finder optical system is split to form an image of the beam on the image pickup device.

The video signals from the image pickup device is reproduced on the screen of a television set provided for monitoring. The operator or the photographer can perform taking a still picture while observing the image on the monitoring television.

In an aspect of the present invention, the single-lens reflex camera comprises means for holding an auto iris control unit and an auto sensitiveness control mechanism in the positions immediately before mirror-up throughout the mirror-up step. The auto iris control unit and the auto sensitiveness control mechanism are devices mounted on the video pickup unit. In the single-lens reflex camera, a turnable mirror is turned up in link with an exposure operation of the camera and the light toward to the viewfinder is blocked out by the turned-up mirror. When the mirror is turned down and the light is again allowed to enter the finder, the auto iris control unit and the auto sensitiveness control mechanism are released from the above holding. In this embodiment, therefore, the optimum state of video exposure can be obtained immediately after the completion of every exposure.

In another aspect of the invention, the single-lens reflex camera comprises a particular display device disposed within the finder. In the reflex camera, the aspect ratio of the finder image is set to 2:3 in accordance with the frame of picture area. The display device in the finder is so disposed to form an image of finder in a size smaller than the video image the aspect ratio of which is 3:4. Furthermore, it forms images of data about still picture-taking such as shutter time and aperture value in the marginal space around the finder image formed on the image pickup device.

In a preferred embodiment, an image of the whole view field of the finder is formed on the image pickup device by a video optical system and the image of the data of the still picture-taking is illuminated by illumination means. Said illumination means is disposed to illuminate the data image appearing in the finder at the optimum display illuminance by the illumination light from a light source mounted in a light window of the finder. In this embodiment, therefore, the data of the still picture-taking can be clearly displayed around the view field image so that the operator can easily observe the data image while video-monitoring the image of the finder view field.

These and further objects, features and advantages of the invention will appear more fully from the following description of embodiments with reference to the accompanying drawings.

DESCRIPTION OF PREFERRED EMBODIMENTS

Figures 1, 2:
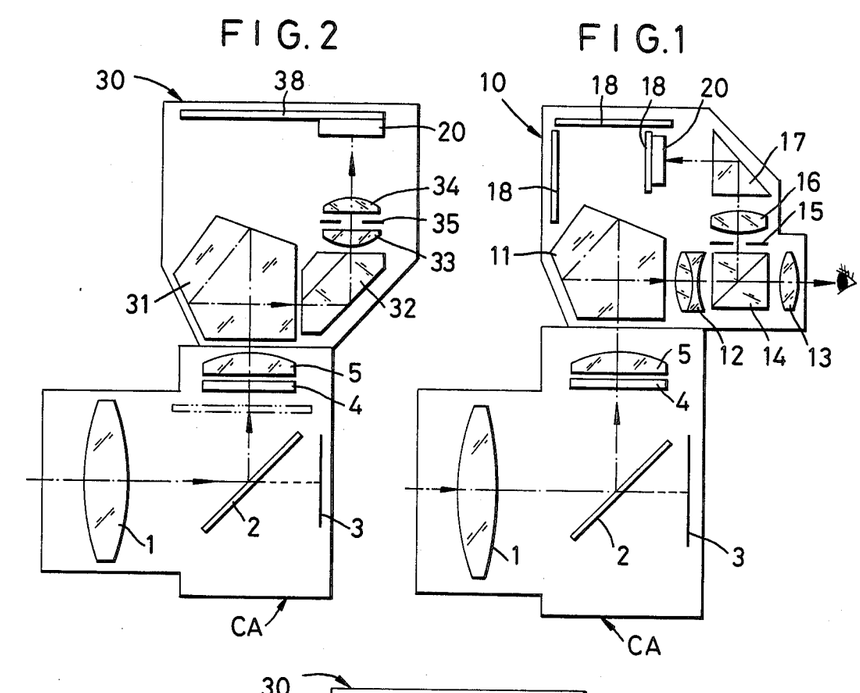
FIG. 1 is a schematic view of a single-lens reflex camera showing a first embodiment of the present invention.
FIG. 2 is a similar view showing a second embodiment of the invention.

Referring first to FIG. 1 there is schematically shown a first embodiment of the invention.

The reference character CA generally denotes the main body of a single-lens reflex camera. A beam of light from an object enters a photographing lens 1 and passes through a well-known structure of the singlelens reflex camera. A reflecting mirror 2 reflects the light beam upwardly to form an image on a focusing screen 4. A photographing film 3 is disposed behind the reflecting mirror 2. In link with a shutter releasing motion, the mirror 2 is turned up so that the light transmitted through the lens 1 may be focused on the film 3.

On the other hand, the light passed through the focusing screen 4 is dispersed and then condensed by a condenser lens 5. The concentrate light enters a finder unit generally designated by 10. At first, the concentrated light passes through a penta-roof prism 11 and then enters the eyepiece 12, 13 of the finder through which the operator can observe the image formed on the focusing screen 4 with his eye.

A solid state image pickup device 20 which may be, for example, a CCD, is incorporated into the finder unit 10. In order to refocus the image of the focusing screen 4 on the image pickup device 20 there is provided a video optical system.

The video optical system comprises a beam splitter 14, an aperture 15, an imaging lens 16 and a rectangular prism 17. The beam splitter 14 is positioned between the eyepieces 12 and 13 of the finder. The light from the penta-roof prism 11 is split by the beam splitter. The split beam passes through the aperture 15 provided for controlling the light intensity. Finally, the split beam is focused on the image pickup device 20 by the imaging lens 16 through the rectangular prism 17.

The image pickup device 20 is composed of sensor elements arranged on a printed substrate 18 which has an electric circuit for video camera. The output from the electric circuit is a video signal corresponding to the optical image formed on the image pickup device.

Although not shown in the drawing, the electric circuit in the finder unit is internally connected with an electric circuit (not shown) in the camera body CA through signal lines for transmitting and receiving various information required for the video-monitored still photographing.

The manner of remote control photography with the above embodiment is as follows:

At first, the operator sets the camera at a desired location for picture-taking and then carries out framing with his eye through the eyepiece of the view finder. After completing the framing, the operator leaves the camera site for a monitoring site distant from the camera site. At the monitoring site there is set a television receiver which is connected with the above camera through signal lines or wirelessly to receive the image picked up by the image pickup device 20 on the camera side. The operator monitors the image appearing on the television screen as a monitor image and waits for a shutter chance. Getting a good shutter chance, the operator shoots a still picture by a remote operation.

FIG. 2 shows a second embodiment of the present invention.

Reference numeral 30 generally denotes a finder unit according to the second embodiment. Again, the finder unit 30 includes a video optical system which, in this embodiment, comprises a penta roof prism 31, a roof prism 32 and a pair of imaging lenses 33 and 34 with a light intensity control aperture 35. The light from the penta roof prism 31 is reflected by the roof prism 32 and then focused on a image pickup device 20 through the pair of imaging lenses 33 and 34.

The roof prism 32 used in this embodiment has a first transmissive surface facing the penta prism 31, a second transmissive surface facing the imaging lens 33 and orthogonal to the first transmissive surface and a pair of reflective surfaces disposed between the first and second transmissive surfaces and orthogonal to each other. The incident light to the roof prism 32 and the reflected light by the roof prism 32 are in an inverted relation to each other in vertical direction as well as in horizontal direction. Therefore, in the embodiment, the number of times of reflection required for the light between the penta prism 31 and the image pickup device 20 is only one, which enables to simplify the video optical system and to realize a compact construction of the finder unit. In this respect, the second embodiment is advantageous over the first embodiment. In the first embodiment, the incident light is reflected by the beam splitter and the rectangular prism. Compared with the incident light, the image of this reflection light formed on the image pickup device is inverted only in vertical direction. In horizontal direction, the image of the reflected light is the same as that before reflection. In this case, since an image inverted only in vertical direction is formed on the image pickup device, a particular structure of image sensor is needed for the image pickup device. As an example, when the image pickup device 20 is formed of a CCD (Charge Coupled Device), such a particular structure will be needed in which the horizontal charge transfer direction is reversed.

The vertically inverted image may be restored to the original uninverted state by further reflecting it. And the uninverted image may be focused on the image pickup device in the first embodiment. However, in order to realize it, two reflecting mirrors are required, which renders the video optical system unduly complicated.

Other parts of the second embodiment correspond to those of the first embodiment. The image pickup device 20 is, like that in the first embodiment, on a printed substrate 38 having an electric circuit through which the optical image formed on the image pickup device 20 is outputted as a video signal.

The finder unit 30 may be formed as an attachment detachable from the camera body CA. If the finder unit can easily be exchanged for an ordinary finder, it will be convenient to the user. In this case, the finder unit and the camera body may be connected in the manner as shown in FIG. 3.

Figure 3:
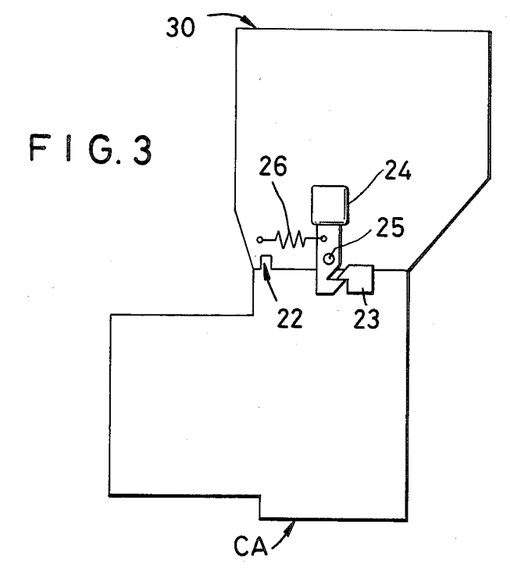
FIG. 3 is a view showing the manner of connection between camera body and finder unit.

Referring to FIG. 3, the camera body CA and the finder unit 30 are aligned by an alignment key 22. A lock member 23 is fixed to the camera body CA. The finder unit CA has a lock operation member 24 engageable with the lock member 23. The lock operation member is rotatable about a pin 25 and biased by a spring 26 intending to rotate the member 24 counter-clockwisely. Through the engagement between the two members 23 and 24, the camera body and the finder unit are connected together detachably.

The electric circuit on the printed substrate 38 and the aperture 35 in the finder unit will be described in detail with reference to FIG. 4.

As previously mentioned, the aperture 35 is interposed between lenses 33 and 34. An image of the finder view field is formed on the sensor surface of the image pickup device 20 through the imaging lenses 33, 34.

The finder viewfield image is read out as a sensor signal by a driver 40. The signal is transmitted to a video signal processor 42 through a sample hold circuit 41 and an auto gain control (AGC) circuit which functions as an automatic sensitiveness controller. In the video signal processor 42, the input signal is converted into a television signal, for example, a color television signal based on the NTSC system. The television signal is sent out to a monitor television from the processor 42.

An auto iris control circuit receives the video signal from the sample hold circuit 41 to control the aperture 35.

Firstly, the construction and operation of the auto gain control circuit will be described.

The video signal from the sample hold circuit 41 is inputted into a voltage gain control amplifier 43. A detector 44 generates a DC voltage corresponding to the amplitude of the amplified output from the amplifier 43. The DC voltage from the detector 44 is applied to one of the inputs of a difference amplifier 46 through a hold circuit 45. Applied to the other input of the difference amplifier 46 is a constant voltage from a reference voltage supply 47. The voltage difference between the DC voltage from the detector 44 and the constant voltage from the reference voltage supply 47 is fed back to the amplifier 43 thereby forming an AGC loop. Thus, the amplification gain of the amplifier 43 is controlled in accordance with error voltage in such manner that the amplification gain may be kept at a constant value determined by the reference voltage of the reference voltage supply 47.

The construction and operation of the auto iris control circuit are as follows:

In the auto iris control circuit, a detector 50 receives the video signal from the sample hold circuit 41 and generates a DC voltage corresponding to the level of amplitude of the input video signal. The output voltage from the detector 50 is applied to one of the inputs of a difference amplifier 52 through a hold circuit 51.

Applied to the other input of the difference amplifier 52 is a constant voltage from a reference voltage supply 53. The reference voltage determines the intensity of the incident light to the image pickup device 20. The output of the amplifier 52 is an error voltage determined by the difference between the reference voltage and the DC voltage corresponding to the video signal from the detector 50. The output error voltage is introduced into a driver 54 to mechanically control the opening of the aperture 35 in such manner that the intensity of the incident light may be kept at a constant level determined based upon the reference voltage supply 53.

Generally, in a single-lens reflex camera, the reflecting mirror 2 is turned up to a position retracted from the taking light path at the time of exposure. This retracted position is suggested by a phantom line in FIG. 2. In this retracted position, the mirror 2 blocks off the light toward the finder. Because of the temporary absence of incident light, the auto iris control circuit operates in the direction to fully open the aperture 35 and the AGC circuit operates in the direction to increase up the sensitiveness.

Both of the auto iris control circuit and AGC circuit have some time delay in response. Therefore, when the light is again allowed to enter the finder after exposure, the circuits can not follow the sudden change of the intensity of the incident light to the finder. Thereby the troubles of overexposure and haunting of monitor screen image are temporarily caused.

In the control circuit shown in FIG. 4, these troubles are eliminated by the hold circuits 45, 51 and a timer circuit 48 in the following manner.

As previously mentioned, the mirror is turned up in link with the start of exposure and the incident light to the image pickup device 20 is shut out by it. This shutout of the incident light continues during the time when the mirror is in the retracted (turned-up) position. This time period is referred to as mirror-up period. The thing essential is to inhibit the AGC circuit and the auto iris control circuit from unnecessarily operating during the mirror-up period.

Figure 4:
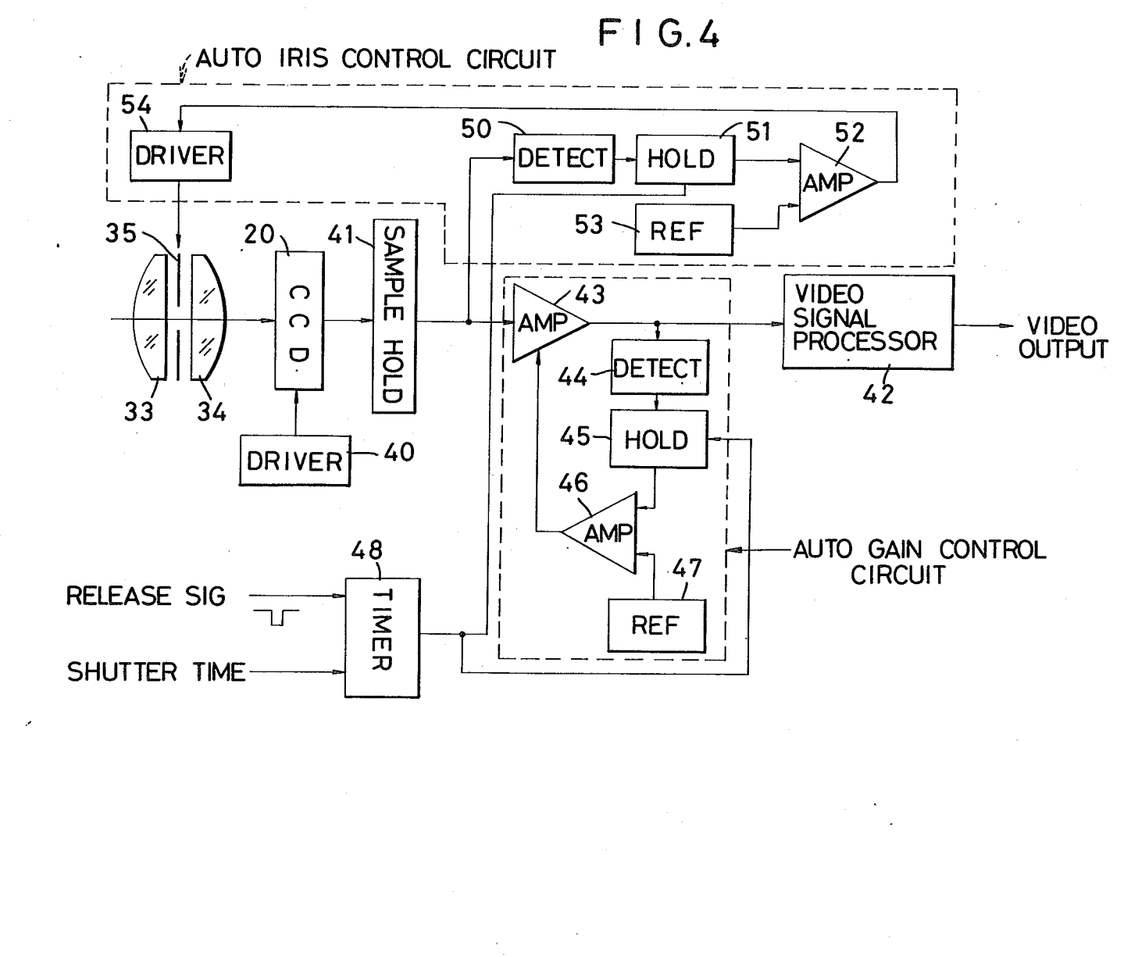
FIG. 4 is a block diagram of a control circuit in the finder unit.

According to the embodiment shown in FIG. 4, during the mirror-up period, the hold circuits 45 and 46 receive an output signal from the timer 48 to inhibit the control operations of the AGC circuit 45 and the auto iris control circuit 51 respectively.

To this end, when an exposure is started, an exposure start instruction signal, namely a release signal is applied also to the timer 48. In response to the release signal, the timer 48 generates a hold signal and continues to send the hold signal to the hold circuits 45 and 51 during the whole mirror-up period corresponding to the shutter time now set by a shutter time signal.

The manner of operation of the embodiment shown in FIG. 4 is as follows:

Before the generation of a release signal, the turnable mirror 2 is in the position interposed in the taking light path as shown in FIG. 2. The beam of light transmitted through the photographing lens 1 is directed to the finder unit by the mirror 2. The sample hold circuit 41 generates a video signal whose signal level corresponds to the intensity of the incident light to the image pickup device 20. The detector circuits 44 and 50 detect the video signal and output a DC detection voltage corresponding to the intensity of the incident light.

In the AGC circuit, the detection voltage of the detector 44 is applied to the difference amplifier 46 through the hold circuit 45 as it is.

If the sign of the error voltage is plus (+), the amplifier 43 so operates as to decrease the amplification gain. If the sign of the error voltage is minus (−), the amplifier so operates as to increase the amplification gain.

Consequently, the video signal applied to the video signal processor 42 is kept at a constant signal level lying between white level and black level irrespective of the intensity of the incident light.

On the other hand, in the auto iris control circuit, the DC detection voltage of the detector 50 is applied to the difference amplifier 52 as it is. When the sign of the error voltage is minus, the driver 54 is driven in the direction to further open the aperture 35. On the contrary, when the sign is plus, the driver is driven in the direction to close the aperture 35. In this manner, the intensity of the incident light to the image pickup device 20 is controlled to a constant video signal level determined by the reference voltage of the reference voltage supply 53.

When a release signal is generated, the timer circuit 48 starts generating the above-mentioned hold signal and sends the signal to the hold circuits 45 and 46.

The output of the hold signal continues throughout the shutter time determined by a previously obtained shutter time signal. Receiving the hold signal, the hold circuit 45 holds the detection voltage of the detector 44. Irrespective of change in the detection voltage of the detector 44 after that, the hold circuit 45 continues to apply to the difference amplifier 46 the constant DC detection voltage then held. Therefore, during this period, the gain of the amplifier 43 remains fixed to the value given immediately before the mirror-up.

Also, the hold circuit 51 holds the DC detection voltage of the detector 50 and continues to apply it to the amplifier 52. Therefore, even after the incident light to the finder unit is shut out by the mirror-up and the output from the detector 50 is stopped, the aperture 35 remains fixed in the position immediately before the mirror-up.

After the lapse of the determined shutter time, the output of the hold signal from the timer 48 is terminated and the mirror 2 is returned back to the position to guide the light to the finder unit. At this time point, the hold circuits 45 and 51 are released from the holding by the above hold signal.

Hereinafter, some examples of information display in the finder will be described with reference to FIGS. 5 and 6.

Figure 5:
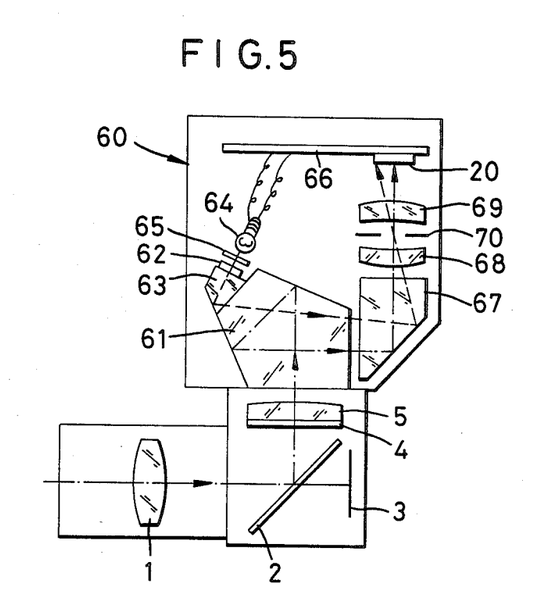
FIG. 5 is a schematic view of a single-lens reflex camera showing a third embodiment of the invention.

In the camera shown in FIG. 5, there is provided a display device 62 left side above a penta roof prism 61. A reflective prism 63 is interposed between the roof prism 61 and the display device 62.

The display device 62 is used to display various information of picture-taking such as shutter time, aperture value, exposure correction mark etc. The display device 62 may be of any suitable type. In the shown embodiment, a liquid crystal display device has been used as the display device 62. The liquid crystal display device is able to display information when it receives a transmission light by illumination light. To this end, an illumination unit 64 is disposed behind the display device 62 with a diffusion plate 65 therebetween. The function of the diffusion plate 65 is to form a plane light source. The illumination unit 64 receives a DC voltage from a driving circuit formed on a substrate 66 and functions as an illumination light source.

Within the finder unit 60, a finder image as well as information by the display device are projected on the light-sensing surface of the image pickup device 20.

Figure 6:
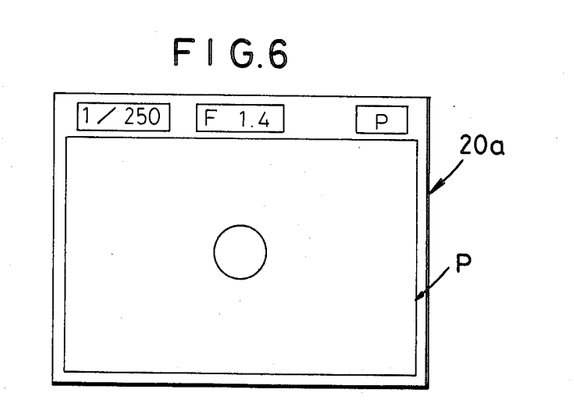
FIG. 6 is a plan view showing an example of the finder image with exposure information projected on the sensor of the image pickup device.

FIG. 6 shows an optical image of the finder image and an optical image of the display device projected on the sensing surface of the image pickup device 20. These optical images appear on the screen of the monitor television as they are.

In FIG. 6, the reference numeral 20a denotes the sensing surface of the image pickup device 20. An object image formed on the focusing screen 4 and the picture-taking information displayed on the display device 62 are projected on the sensor surface 20a through the video optical system comprising the penta roof prism 61, roof prism 67 and imaging lenses 68, 69. The outline of the object image projected on the sensor surface 20a is designated by P in FIG. 6.

In the case of 35 mm still camera, the aspect ratio of the finder image is 2:3 which corresponds to the picture frame of the film. On the other hand, the aspect ratio of the video picture is 3:4.

Taking into account this difference in aspect ratio between the finder image and video picture, the image formed on the focusing screen 4 is projected by the video optical system with such a reduction that all the projected image P may be contained in the sensor surface 20a.

When the possible largest projection image P is formed without any projection beyond the area of the sensor surface 20a, that is to say, when the magnification of the video optical system is so selected that the projection image P formed by it may approximately correspond to the width of the video picture, a substantial blank space will be formed above and/or under the project image P.

The display device 62 and the prism 63 are arranged in such positions in which the display of information such as shutter time, aperture value, taking mode etc. can be made within the blank space as mentioned above.

Figure 7:
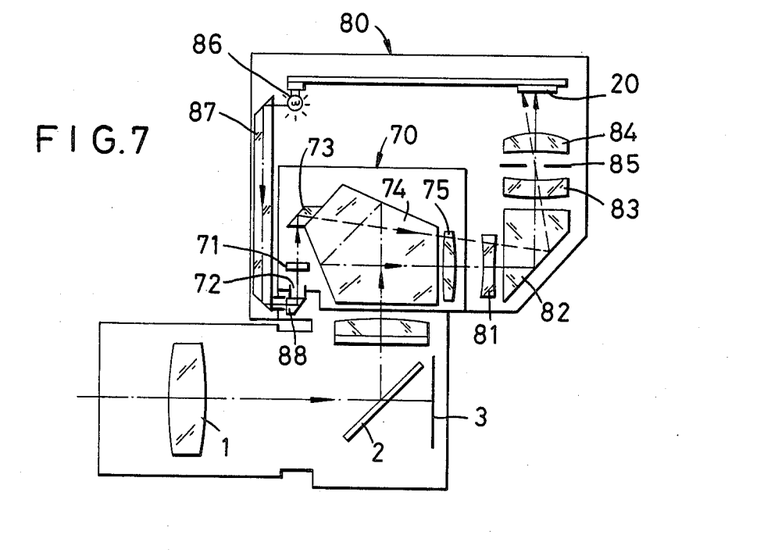
FIG. 7 is a schematic view of a single-lens reflex camera showing a fourth embodiment of the invention.

FIG. 7 shows a further embodiment of the invention. In this embodiment, a video viewfinder is formed as an attachment which can be mounted on the finder of the conventional single-lens reflex camera.

Referring to FIG. 7, the finder unit 70 has a mount-in display device 71 for displaying the information in the area surrounding the picture to be taken. A light window (an aperture for admitting light) 72 is provided in the finder unit 70. The display device 71 is illuminated by the light from through the light window 72.

The display image illuminated by the above illumination light is reflected by a reflective prism 73 and then passes through a penta roof prism 74. Thereafter, it is projected on the finder window by an eyepiece 72. Therefore, the operator can observe not only the picture field but also displayed information such as shutter time, aperture value etc. near the picture field in the finder through the eyepiece.

The video attachment 80 is mounted in such manner as to enclose the finder unit 70.

The video attachment 80 comprises a telecentric lens 81, a roof prism 82, a pair of imaging lenses 83 and 84 with an aperture 85 interposed therebetween and an image pickup device 20.

The telecentric lens 81 is disposed opposed to the eyepiece 75 and is able to have the whole view field image of the finder enter the roof prism 82. The optical image from the lens 81 is reflected to the imaging lenses 83, 84 by the prism 82. Through the imaging lenses the display image in the finder is focused on the sensor surface of the image pickup device 20 mounted on a substrate. On the left-hand side of the substrate there is provided an illumination unit 86.

The light from the illumination unit 86 is guided at first to a light window opened to the camera body side through a prism 87 and then guided further to the previously-mentioned light window 72 through a prism 88. From the window 72, the illumination light is finally guided to the display device 71.

A projection image similar to that previously shown in FIG. 6 is formed on the light-sensing surface of the image pickup device 20.

Figure 8:
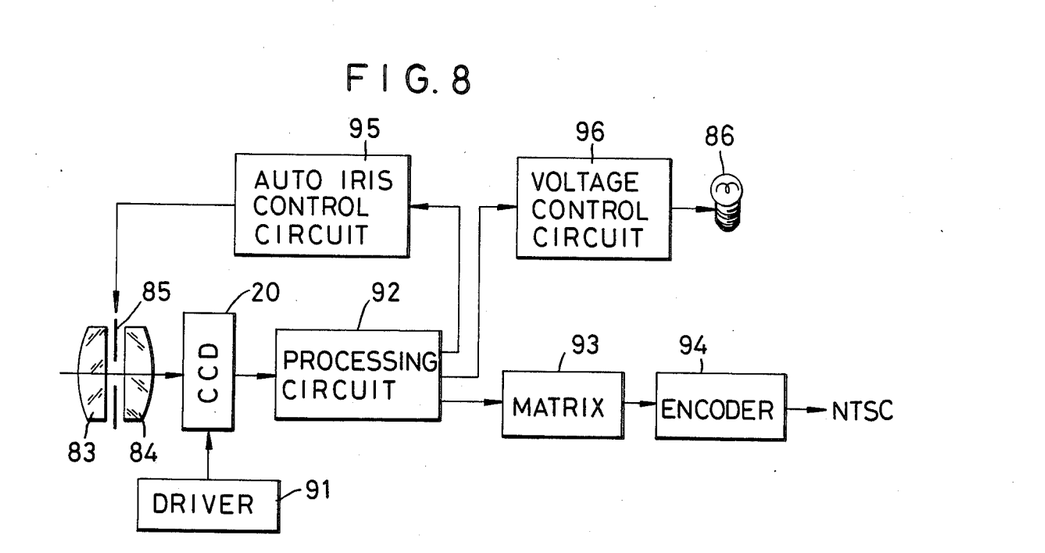
FIG. 8 is a block diagram of a control circuit in the finder attachment shown in FIG. 7.

FIG. 8 is a block diagram of the control circuit on the substrate in the attachment 80. Although not shown, the embodiment above shown in FIG. 5 also has a similar control circuit.

Referring to FIG. 8, a driver 91 drives the image pickup device 20 so that the view field image of the finder as shown in FIG. 6 is read out as a video signal. The video signal is inputted into a processing circuit 92 in which the signal is converted into a video signal of a selected television scanning system. The video signal, for example, in the form of NTSC signal, is sent to a monitor television through a matrix circuit 93 and an encoder 94.

On the other hand, the video signal obtained by the processing circuit 92 is applied also to an auto iris control circuit 95 which is substantially the same as that shown in FIG. 4. In accordance with the level of the input video signal, the auto iris control circuit controls the opening of the aperture 85 between the two imaging lenses 83 and 84 so that the intensity of the incident light to the sensor surface of the image pickup device 20 can be kept constant.

The video signal obtained by the processing circuit 92 is applied also to a voltage control circuit 96 which generates a DC control voltage corresponding to the brightness of the picture field P within the finder. The control voltage is applied to the illumination unit 86 to change the intensity of the illumination light from the illumination unit 86 following the brightness of the picture field P.

Since the intensity of the incident light to the sensor surface of the image pickup device 20 is automatically controlled to a constant level through the aperture 85, the DC control voltage to the illumination unit 86 may be controlled also in such manner that it has an opposite control characteristic to the control characteristic of the auto iris control circuit 95.

As the intensity of the illumination light is controlled in the manner described above, the illuminance of the display of information in the upper area of the finder also changes in accordance with the brightness of the picture field P. Therefore, when the image of the whole finder view field is appeared on the monitor screen through the image pickup device, the information display can be observed substantially at the same brightness as that of the picture field.

While we have shown and described particular embodiments of our invention, it is to be understood that the invention is not limited thereto but may be otherwise variously embodied within the scope of the following claims.

What we claim is:

1. A video finder in a single-lens reflex camera, comprising:
   a finder eyepiece;
   a penta roof prism between said eyepiece and a focusing screen on which an object image formed by a photographing lens is projected;
   a beam splitter disposed between said penta roof prism and said finder eyepiece to take out a portion of the light beam travelling toward said finder eyepiece from said penta roof prism;
   means for forming a light image from the beam taken by said beam splitter; and
   image pickup means disposed in the image plane of said image-forming means to form a video signal corresponding to said light image.

2. A video finder in a single-lens reflex camera according to claim 1, wherein said camera has a camera body containing a reflecting mirror for directing the light beam transmitted from the photographing lens toward said focusing screen and wherein said video finder includes a housing for housing said finder eyepiece and said penta roof prism, said housing being connectable with said camera body, and the beam splitter, image-forming means and image pickup means are all contained in said housing.

3. A video finder in a single-lens reflex camera, comprising:
   image pickup means having a light-sensing surface for forming a video signal corresponding to a light image formed on said light-sensing surface:
   a penta roof prism disposed between said image pickup means and a focusing screen on which an object image formed by a photographing lens is projected; and
   a video optical system including a reflective prism disposed between said penta roof prism and said image pickup means and having a roof surface for reflecting the light beam coming from said penta roof prism toward said image pickup means and an image-forming optical system for condensing the light beam from said penta roof prism and projecting the object image formed on said focusing screen onto the light-sensing surface of said image pickup means.

4. A video finder in a single-lens reflex camera according to claim 3, wherein said reflective prism includes a first transmissive surface opposed to the exit surface of said penta roof prism, a second transmissive surface orthogonal to said first transmissive surface and a pair of reflective surfaces disposed between said first and second transmissive surfaces and orthogonal to each other.

5. A video finder in a single-lens reflex camera according to claim 4, wherein said image-forming optical system is disposed between the second transmissive surface of said reflective prism and said image pickup means.

6. A video finder in a single-lens reflex camera according to claim 3, wherein said camera has a camera body containing a reflecting mirror for directing the optical path of the light beam coming from the photographing lens toward said focusing screen and wherein said video finder has a housing for housing said penta roof prism, said housing being connectable with said camera body, and said image pickup means, reflecting prism and image-forming optical system are all contained in said housing.

7. A single-lens reflex camera comprising:
   image pickup means having a light-sensing surface for forming a video signal corresponding to a light image formed on the light-sensing surface;
   a focusing screen on which an object image formed by a photographing lens is projected;
   a movable reflecting mirror disposed on the optical axis of the photographing lens to direct the light beam coming from the photographing lens toward said focusing screen, said mirror being moved to a position retracted from said optical axis in response to the start of a picture-taking operation and returned back to the position on said optical axis in response to the completion of said operation; and means for holding said image pickup means in the state immediately before the start of said operation, during the period in which said mirror is in the retracted position.

8. A single-lens reflex camera according to claim 7, wherein said camera generates a release signal instructing to start the picture-taking operation, and said holding means holds said image pickup means a determined time long in response to the release signal.

9. A single-lens reflex camera according to claim 8, wherein said holding means includes timer means for counting a time corresponding to the exposure time in response to the release signal.

10. A single-lens reflex camera according to claim 7, wherein said image pickup means includes an image-forming optical system for projecting the object image formed on the focusing screen onto the light-sensing surface; aperture means disposed on the optical path of said image-forming optical system; and aperture control means for controlling said aperture means in accordance with the intensity of the incident light to said image pickup means, and wherein said holding means holds said aperture control means in such manner as to hold it in the state immediately before the start of the picture-taking operation.

11. A single-lens reflex camera according to claim 7, wherein said image pickup means includes means for amplifying the video signal and gain control means for controlling the amplification degree of said amplifying means in response to the level of said video signal and wherein said holding means holds said gain control means in such manner as to keep the amplification degree at the level immediately before the start of the picture-taking operation.

12. A single-lens reflex camera comprising:
image pickup means having a light-sensing surface for forming a video signal corresponding to the object image formed on said sensing surface:
a focusing screen on which the object image formed by a photographing lens is projected;
a video optical system for projecting the object image formed on said focusing screen onto the light-sensing surface of said image pickup means in a determined partial area; and
display means comprising a display medium for visually displaying information for picture-taking and means for projecting the display formed on said display medium onto the light-sensing surface of said image pickup means in a remaining partial area other than the above-said determined partial area.

13. A single-lens reflex camera according to claim 12, wherein the sensing surface of said image pickup means has a rectangular area corresponding to the picture field having an aspect ratio of about 3 (vertical): 4 (horizontal) and the object image on said focusing screen has a rectangular outline of an aspect ratio of about 2 (vertical): 3 (horizontal), and wherein said determined partial area substantially corresponds to said light-sensing surface in horizontal direction.

14. A single-lens reflex camera according to claim 12, wherein said display means includes means for changing the illuminance of said display in accordance with the illuminance of the object image projected on said light-sensing surface.

15. A video finder unit connectable with the eyepiece of a single-lens reflex camera provided with a display device for visually displaying information for picture-taking within the finder view field, comprising:
image pickup means having a light-sensing surface for forming a video signal corresponding to the light image formed on the sensing surface;
a video optical system for receiving the finder light beam from said eyepiece and projecting an object image onto the light-sensing surface of said image pickup means, the display of said information being projected on the sensing surface by said video optical system; and
means for controlling said display device in such manner that said information can be displayed with an adjusted illuminance in accordance with the illuminance of the object image projected on the sensing surface of said image pickup means.

* * * * *